Figure 1:
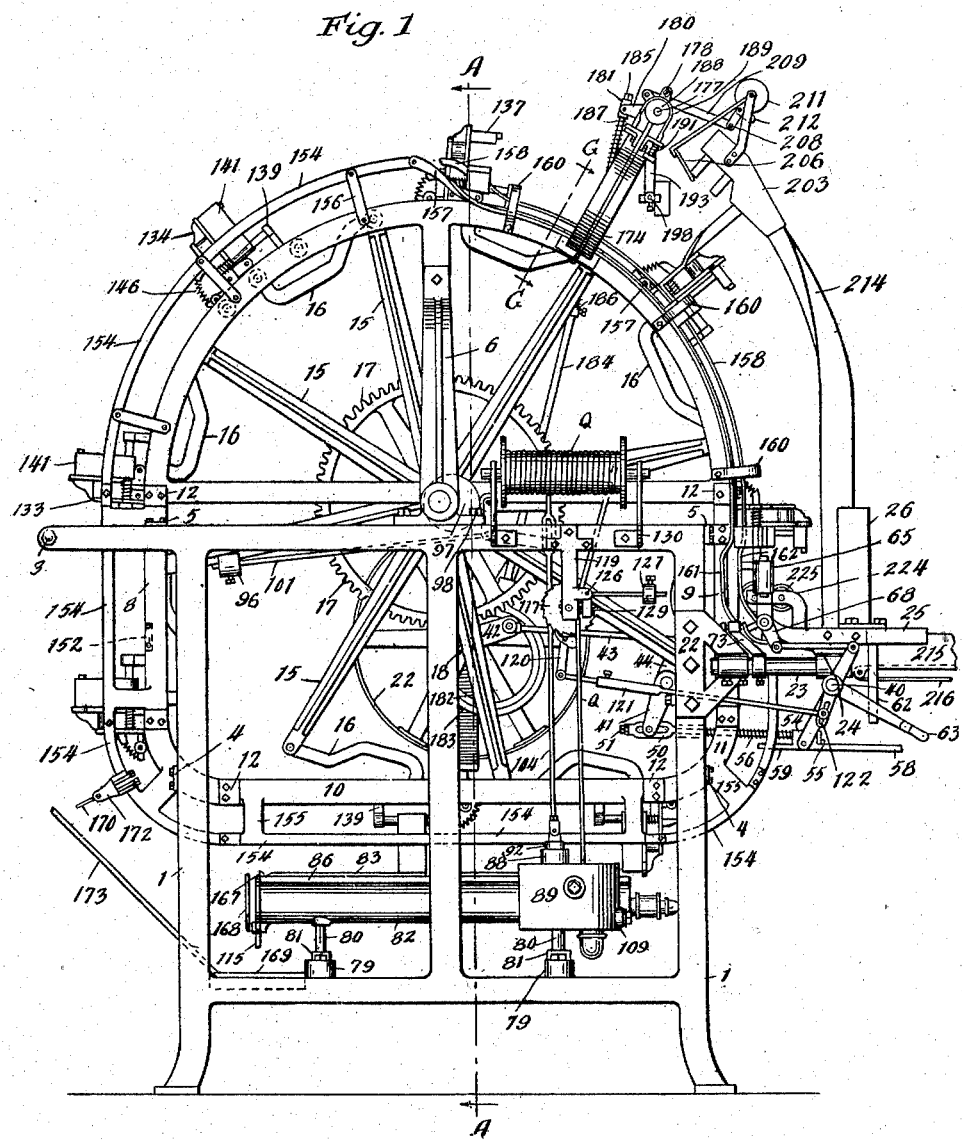

L. C. SHARP.
CAN BODY MAKING MACHINE.
APPLICATION FILED DEC. 13, 1906.

967,068.

Patented Aug. 9, 1910.
13 SHEETS—SHEET 1.

Witnesses:
Wm. Geiger
H. M. Munday

Inventor:
Lee C. Sharp
By Munday, Evarts, Adcock & Clarke.
Attorneys

L. C. SHARP.
CAN BODY MAKING MACHINE.
APPLICATION FILED DEC. 13, 1906.

967,068.

Patented Aug. 9, 1910.

13 SHEETS—SHEET 3.

Witnesses
Wm. Geiger

Inventor:
Lee C. Sharp
By Munday, Evarts, Adcock & Clarke
Attorneys

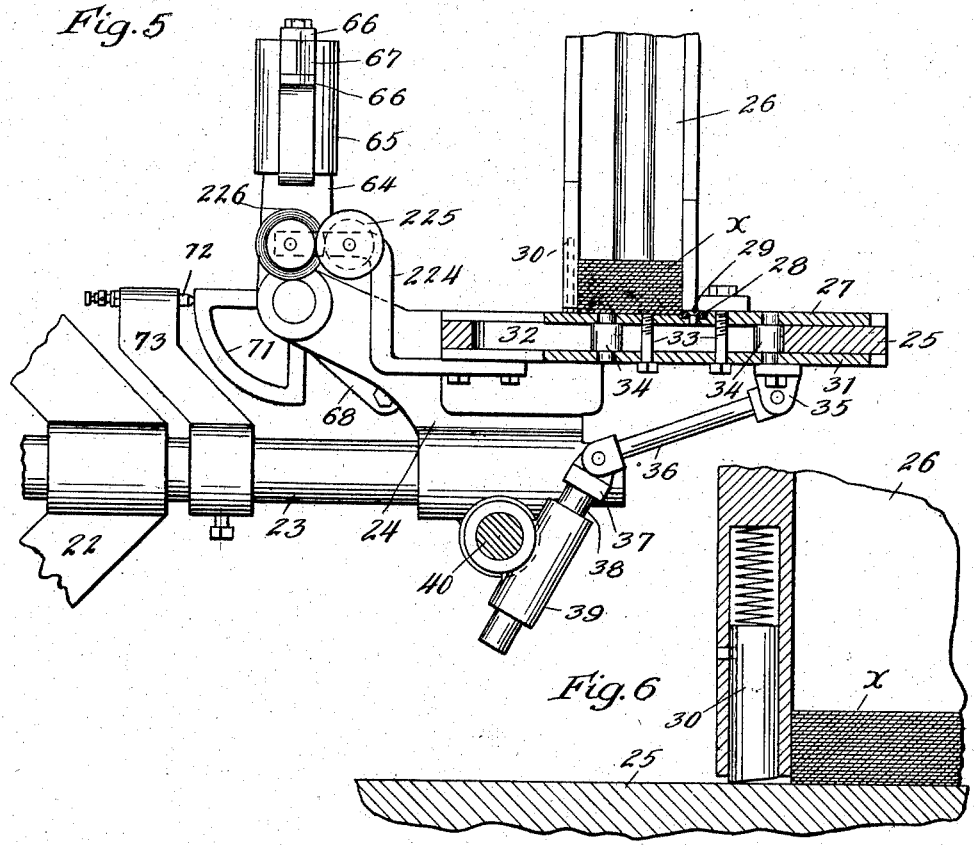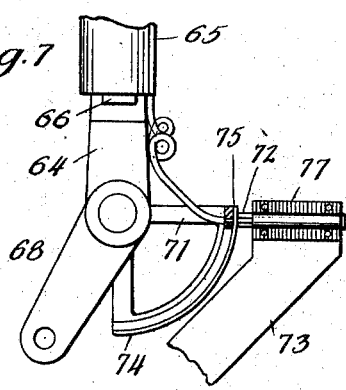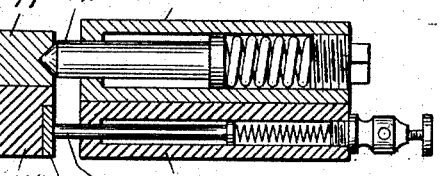

L. C. SHARP.
CAN BODY MAKING MACHINE.
APPLICATION FILED DEC. 13, 1906.
967,068.
Patented Aug. 9, 1910.
13 SHEETS—SHEET 5.
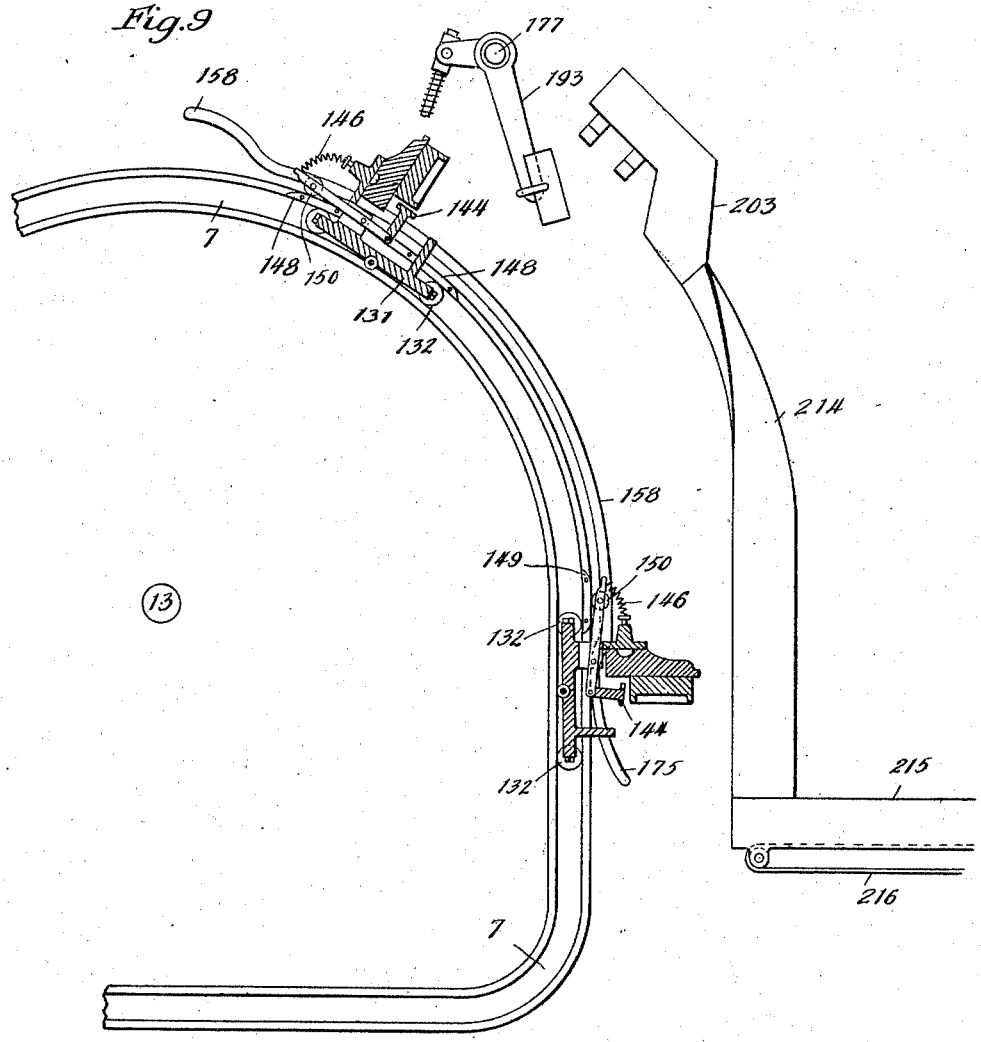

L. C. SHARP.
CAN BODY MAKING MACHINE.
APPLICATION FILED DEC. 13, 1906.
967,068.
Patented Aug. 9, 1910.
13 SHEETS—SHEET 6.
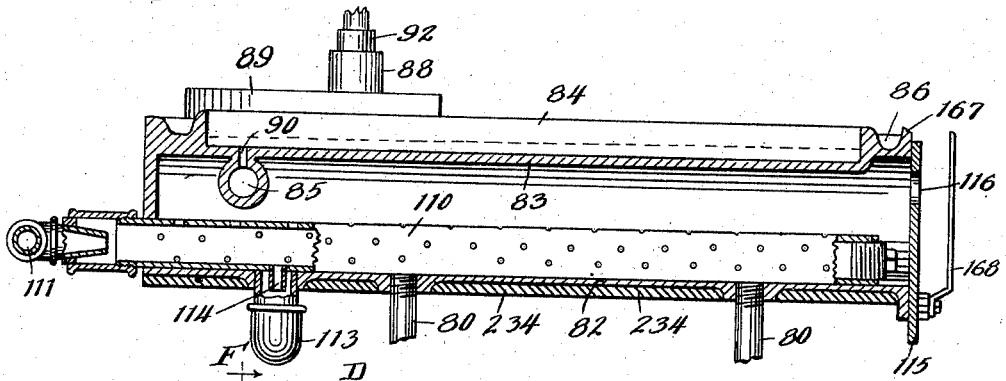
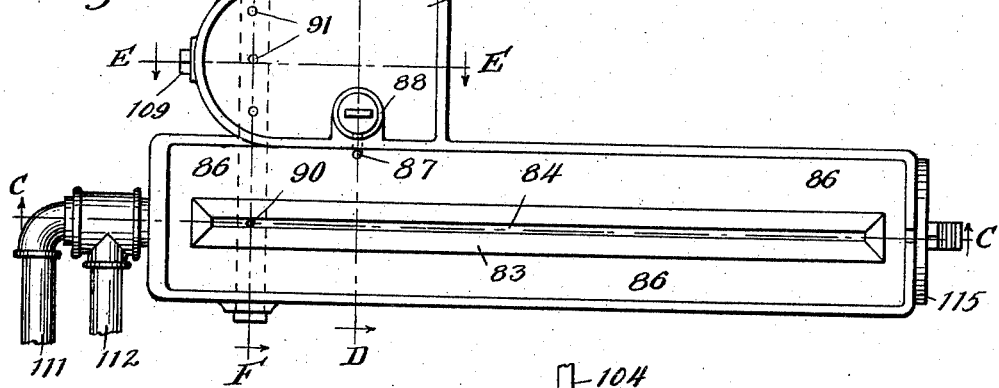
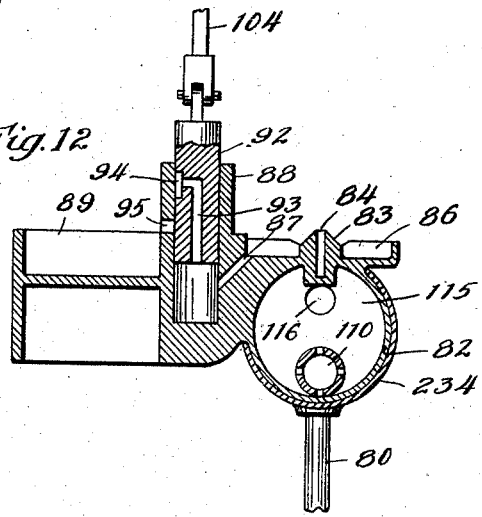
Witnesses:
Wm. Geiger
A. W. Munday
Inventor:
Lee C. Sharp
By Munday, Evarts, Adcock & Clark.
Attorneys L. C. SHARP.
CAN BODY MAKING MACHINE.
APPLICATION FILED DEC. 13, 1906.
967,068.
Patented Aug. 9, 1910.
13 SHEETS—SHEET 7.
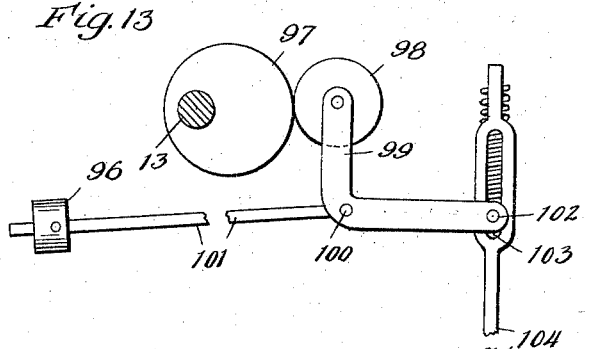
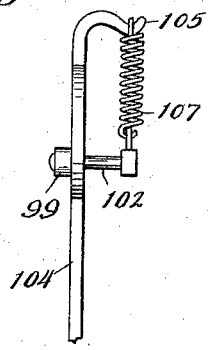
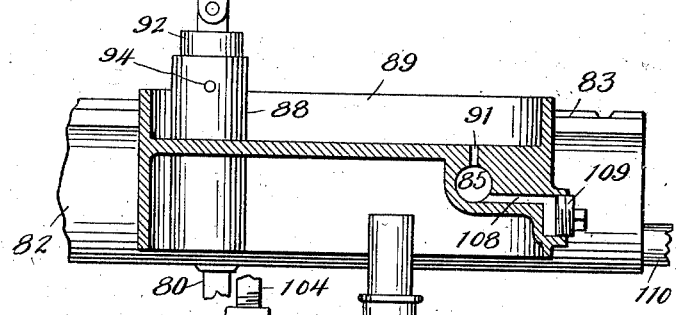
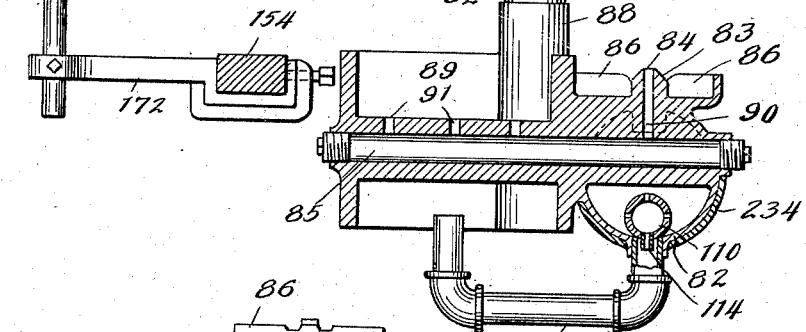
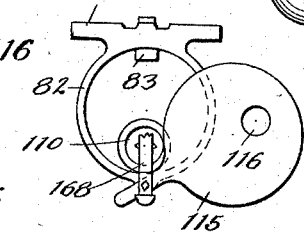
Witnesses:
Wm. Geiger
H. W. Munday
Inventor:
Lee C. Sharp
By Munday, Evarts, Adcock & Clarke.
Attorneys

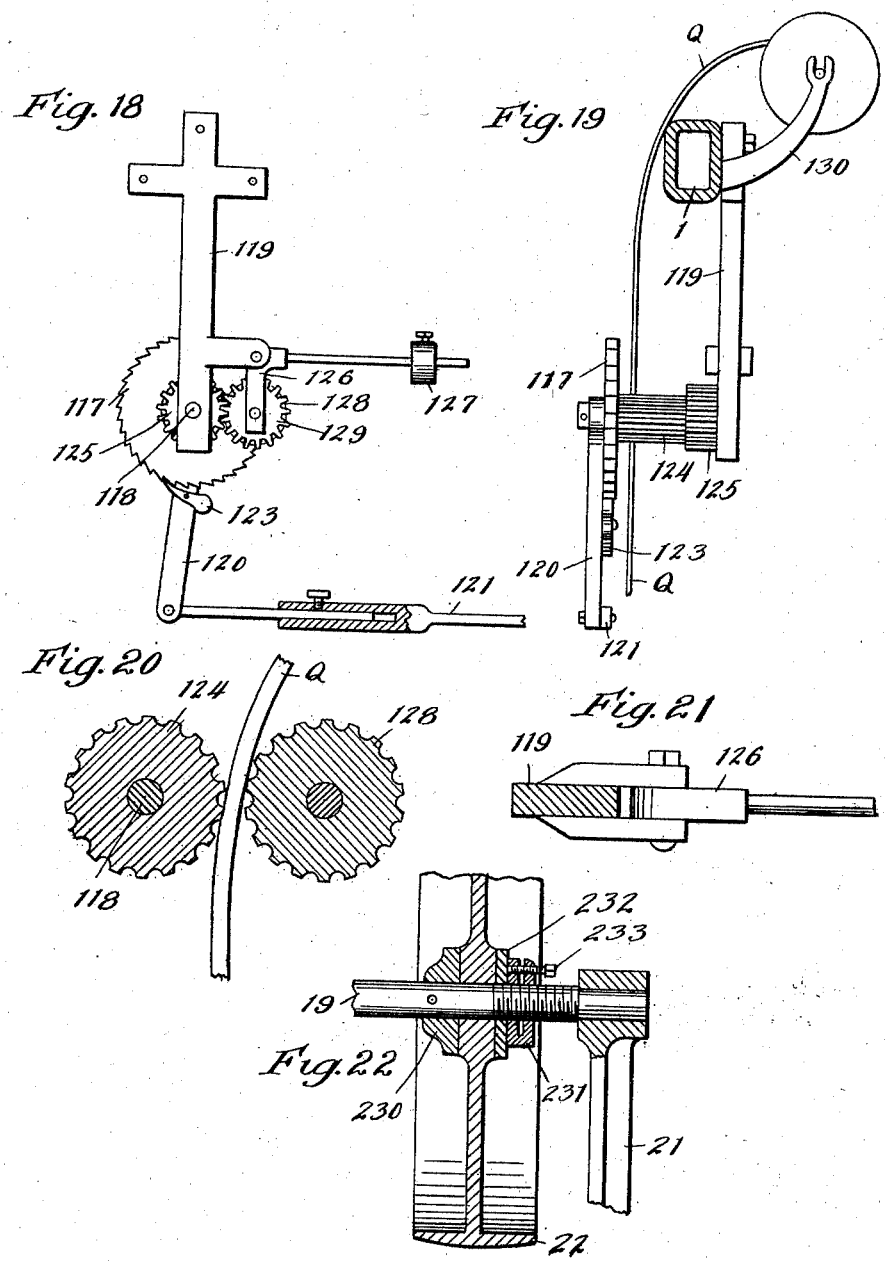

L. C. SHARP.
CAN BODY MAKING MACHINE.
APPLICATION FILED DEC. 13, 1906.
967,068.
Patented Aug. 9, 1910.
13 SHEETS—SHEET 9.
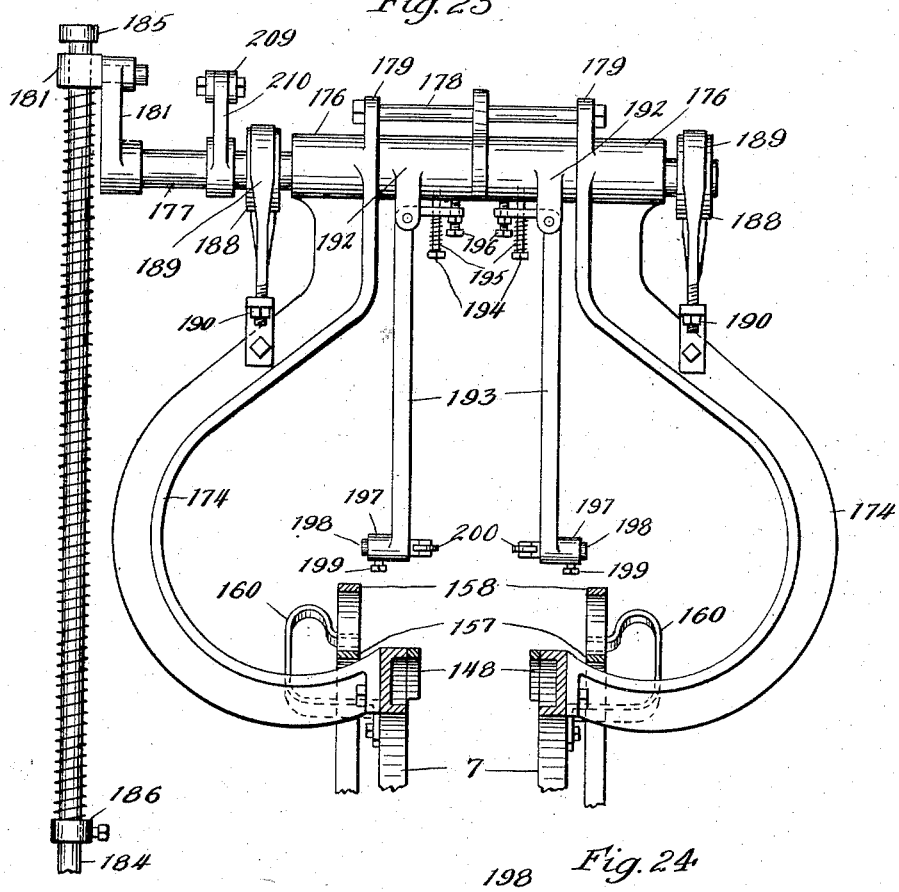
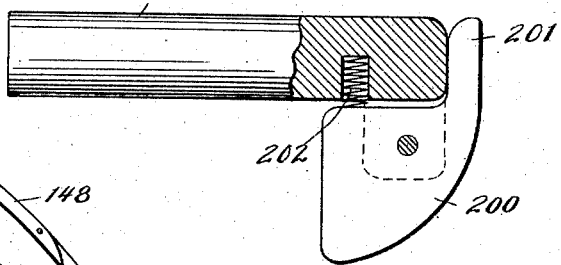
Witnesses:
Wm. Geiger
H. W. Munday
Inventor:
Lee C. Sharp
By Munday, Evarts, Adcock & Clarke
Attorneys

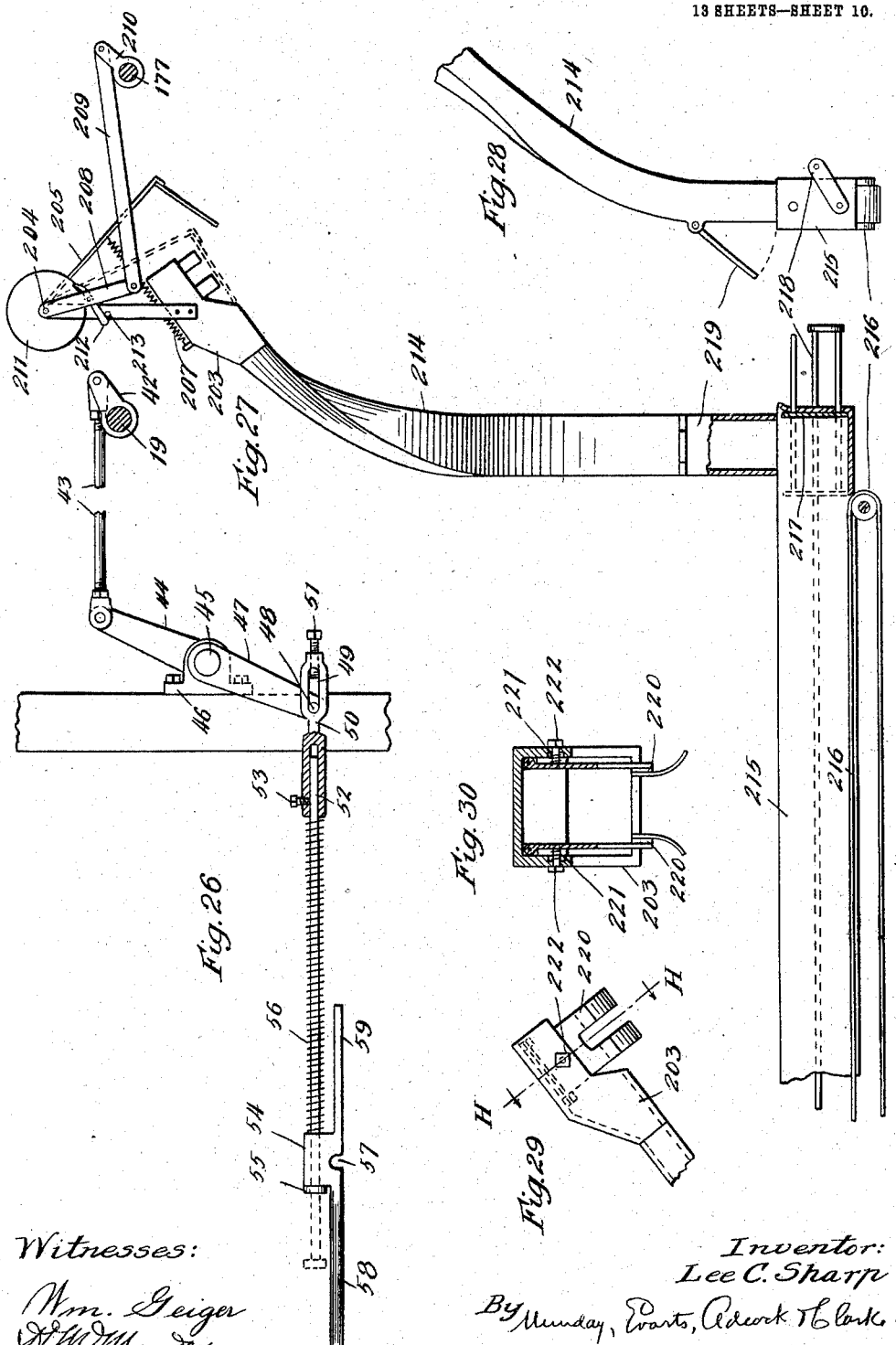

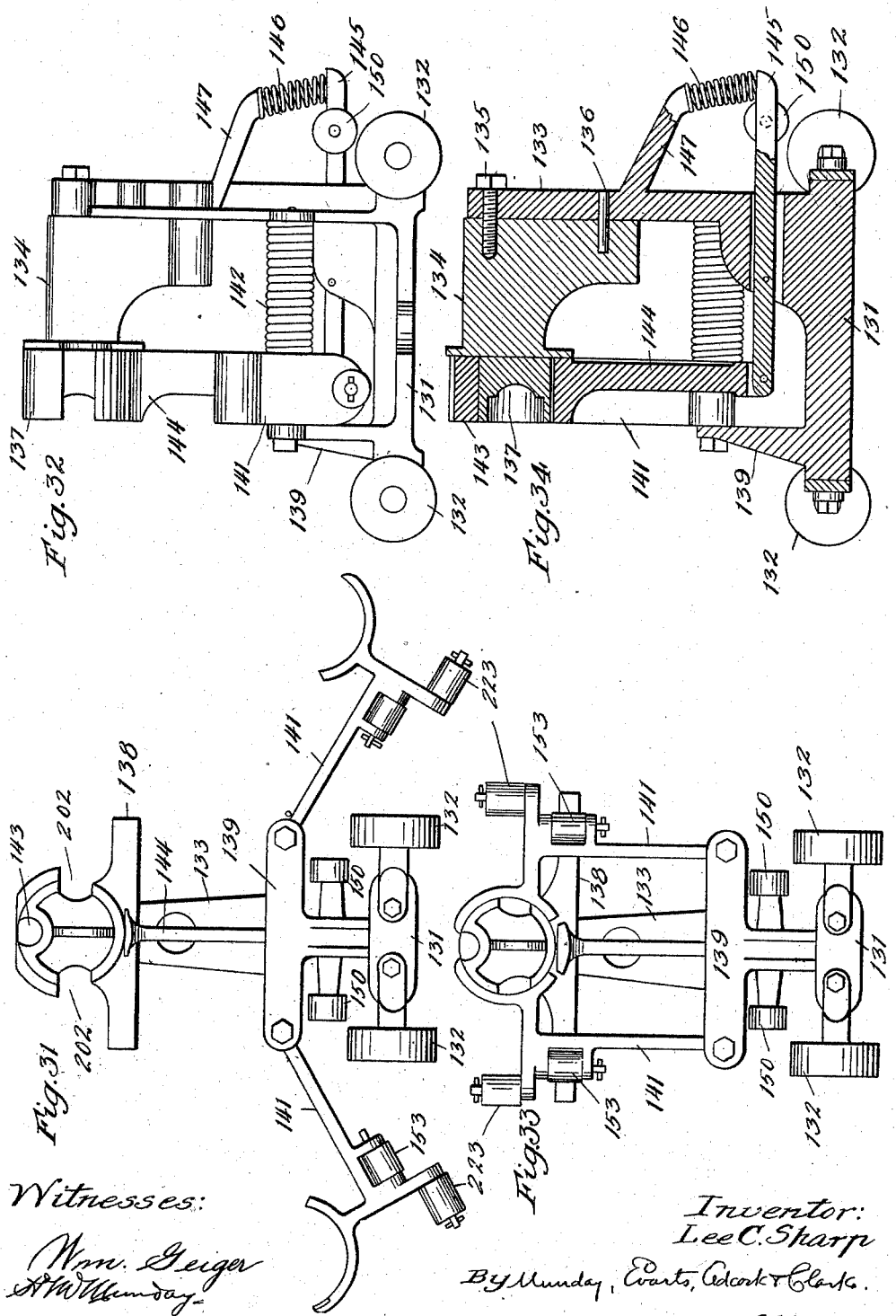

L. C. SHARP.
CAN BODY MAKING MACHINE.
APPLICATION FILED DEC. 13, 1906.
967,068.
Patented Aug. 9, 1910.
13 SHEETS—SHEET 12.
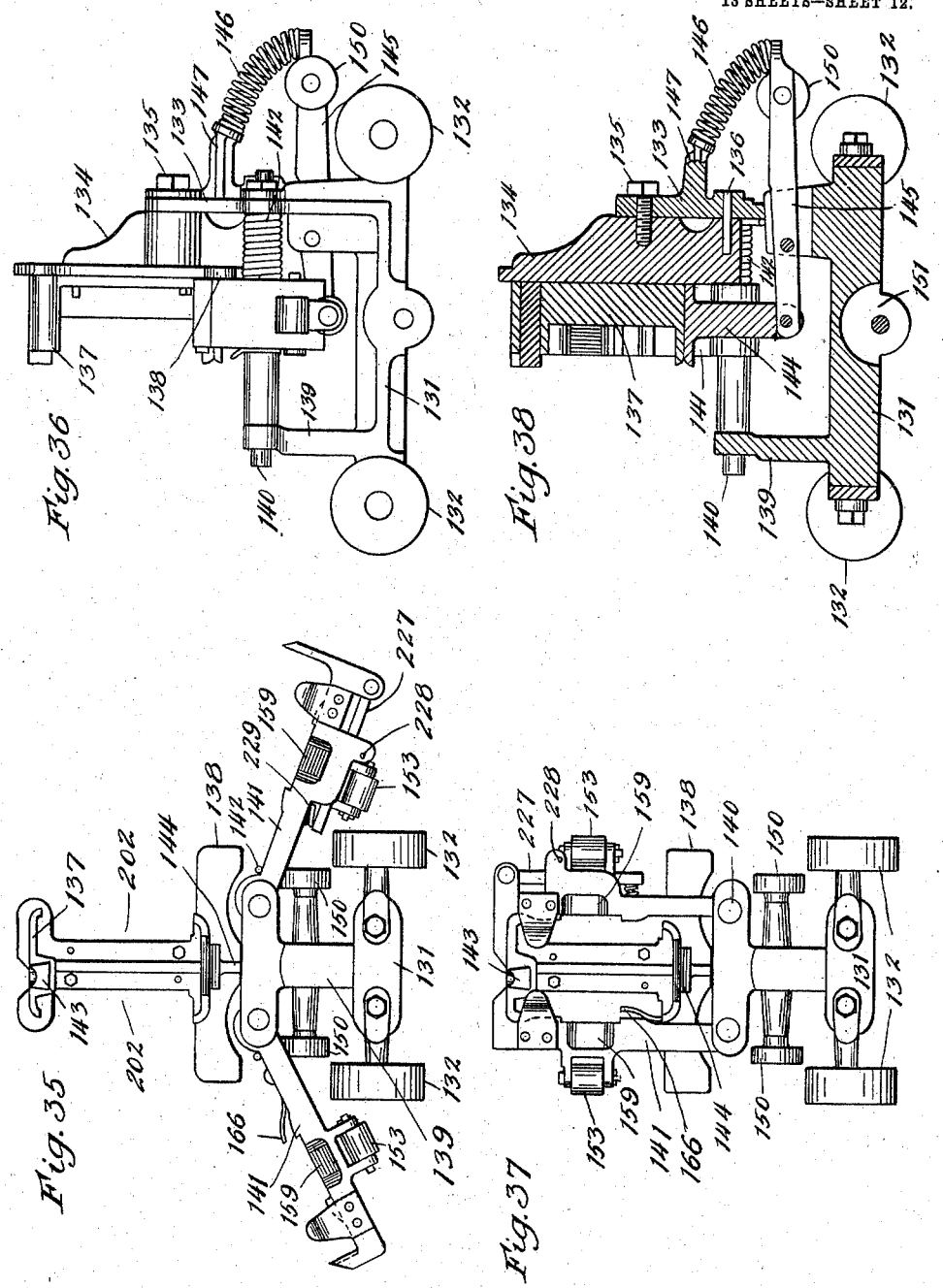
Witnesses:
Wm. Geiger
N. W. Munday
Inventor:
Lee C. Sharp
By Munday, Evarts, Adcock & Clarke
Attorneys L. C. SHARP.
CAN BODY MAKING MACHINE.
APPLICATION FILED DEC. 13, 1906.
967,068.
Patented Aug. 9, 1910.
13 SHEETS—SHEET 13.
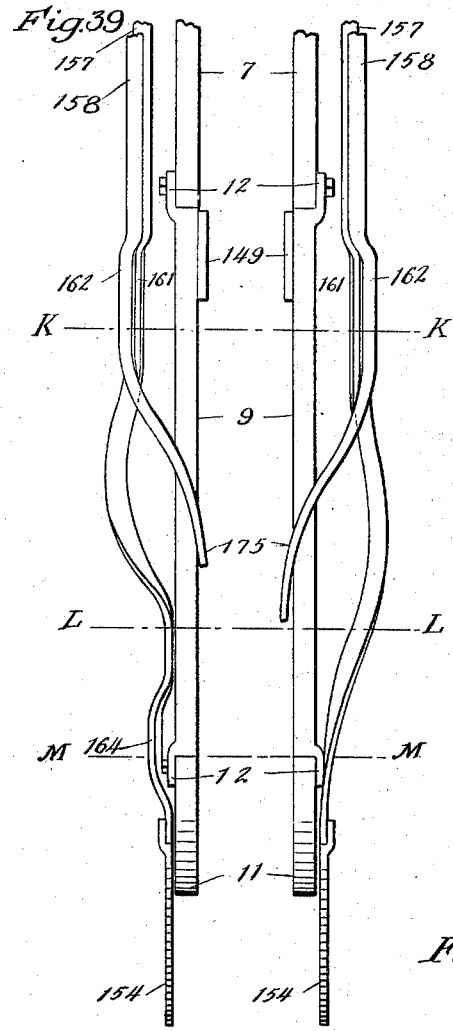
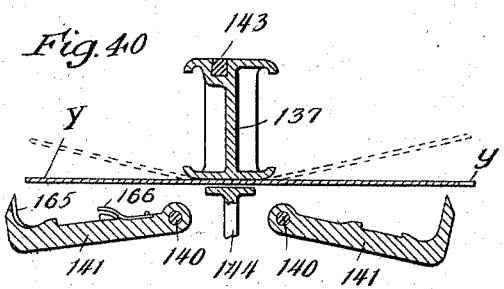
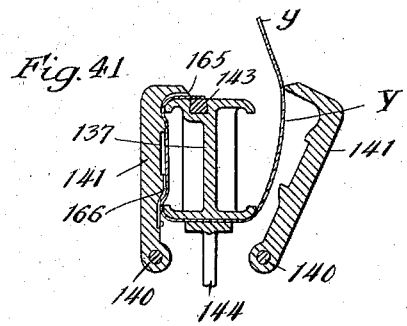
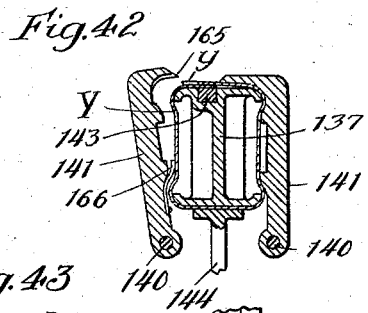
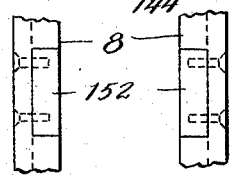
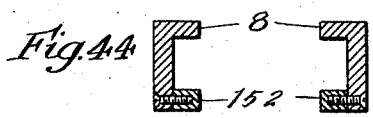
Witnesses:
Wm. Geiger
H. M. Munday
Inventor:
Lee C. Sharp
By Munday, Evarts, Adcock & Clarke
Attorneys

UNITED STATES PATENT OFFICE.

LEE C. SHARP, OF OMAHA, NEBRASKA.

CAN-BODY-MAKING MACHINE.

967,068.

Specification of Letters Patent. Patented Aug. 9, 1910.

Application filed December 13, 1906. Serial No. 347,634.

*To all whom it may concern:*

Be it known that I, LEE C. SHARP, a citizen of the United States, residing in Omaha, in the county of Douglas and State of Nebraska, have invented a new and useful Improvement in Can-Body-Making Machines, of which the following is a specification.

My invention relates to can body making machines, to machines for forming can bodies from flat blanks and soldering the side seams thereof, and more particularly to that class of can body forming and side seam soldering machines wherein a series of continuously moving body forming and holding carriages traveling on an endless track are employed, as in the Foote Patent 480,256, for example.

The object of my invention is to provide an automatic can body forming and side seam soldering machine of a simple, efficient and cheap construction, which will deliver the blanks one by one to the body forming and holding carriages as they pass, fold or form the blanks into can bodies, solder the side seam and deliver the completed and soldered can bodies from the machine, and in which the endless chain conveyer mechanism heretofore customarily employed in machines of this class, may be dispensed with.

My invention consists in the combination with a series or plurality of can body forming and holding carriages, of an endless trackway upon and around which the carriages travel, of a rotating driver or wheel for propelling the carriages along and around the trackway. The rotary driving device or wheel is upright or has a horizontal axis, and the trackway for the carriages is substantially circular except at its lower segment where it is horizontal, to enable the can body holding carriages to properly coöperate with a solder bath and soldering iron. Pivoted links connect the rotary driving device or wheel with the carriages, and compensate for the radially varying distance of the endless track from the driving wheel.

The invention further consists in the novel form of the path or trackway for the body forming carriages, whereby the same is made of minimum length, in the novel construction of the driving means, the same being a simple rotating wheel or spider, in combination with the connecting links, whereby the carriages are given a positive action or movement and kept under positive control at all times, in the novel means for removing a single can body blank from the pile of blanks and directing the same into the path of the moving carriages and delivering the same to a carriage, in the novel construction of the solder containing heating and controlling devices, in the novel construction of wipers or means for removing excess of solder from the seams, in the novel means for removing the soldered and completed can bodies from the continuously traveling carriages, in the novel means for delivering the formed can bodies properly justified as to position, to the auxiliary heading machines.

My invention also consists in the novel devices and in the novel combinations of parts and devices herein shown or described.

Figure 2:
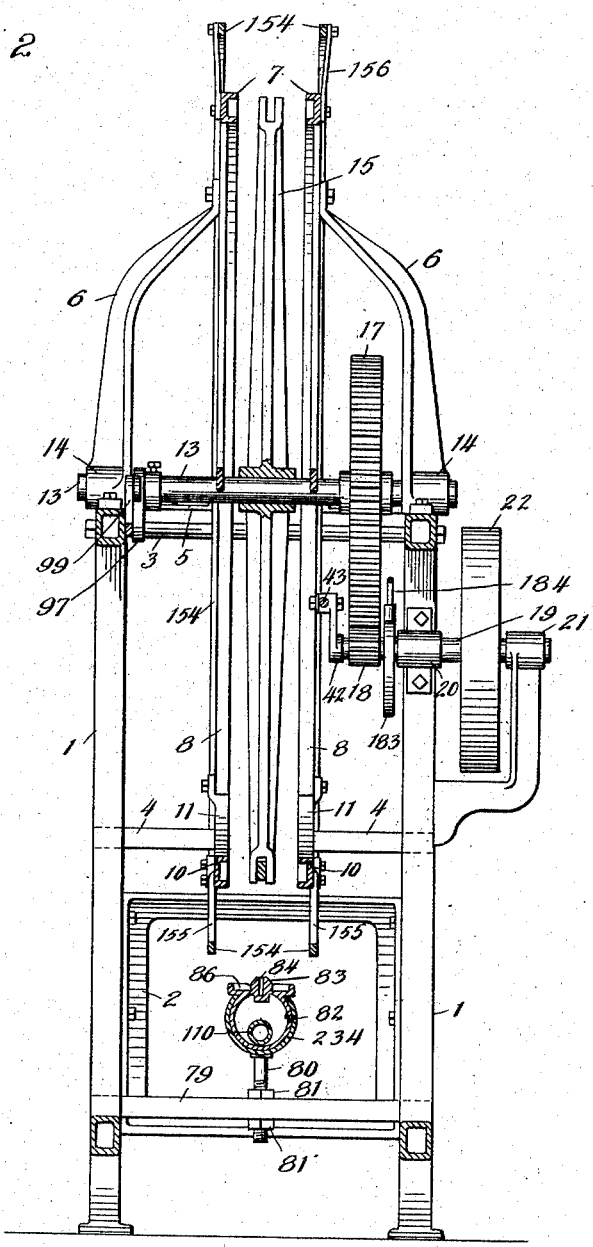
Figure 3:
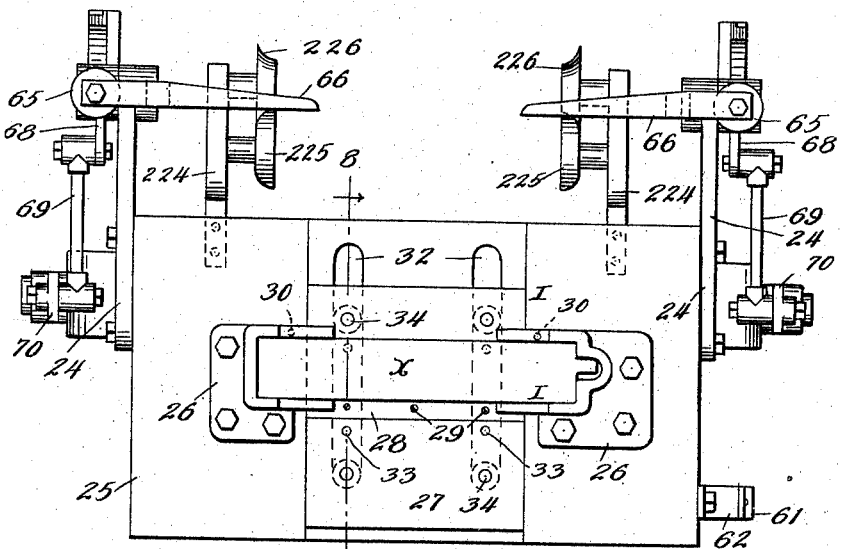
Figure 4:
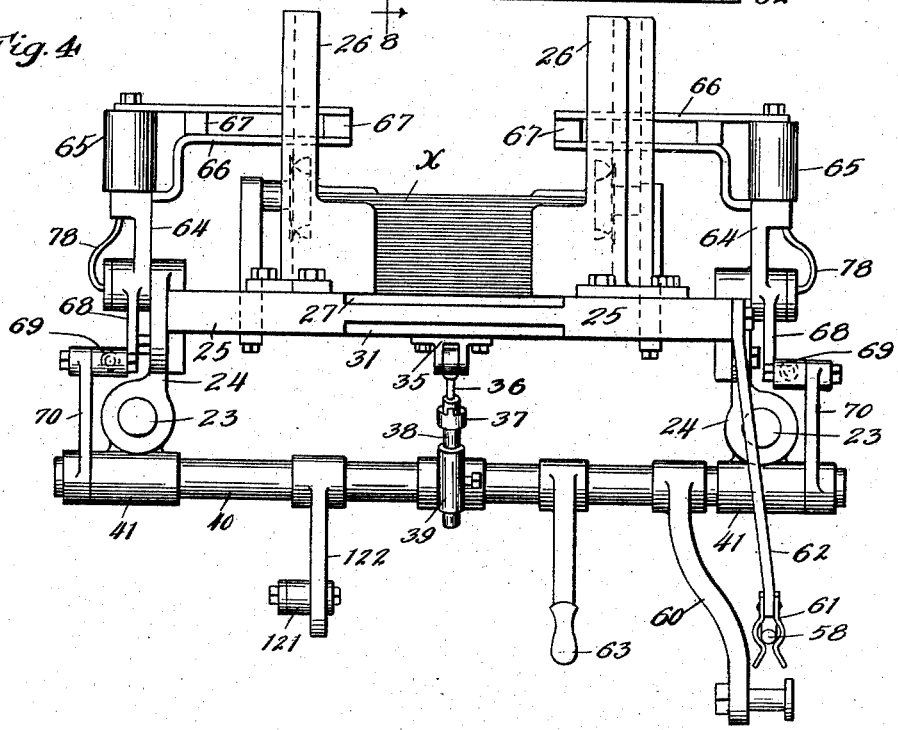

In the accompanying drawings, which form a part of this specification, and in which similar reference characters indicate like parts throughout the several figures, Figure 1 is a side elevation of a machine embodying my invention; Fig. 2 is a sectional end elevation of the same, the section being taken on the general plane of the line A—A of Fig. 1; Fig. 3 is a plan view of the feed table and its accessories; Fig. 4 is an end elevation of the same; Fig. 5 is a longitudinal section thereof, the section being in the plane of the line B—B of Fig. 3; Fig. 6 is a detail sectional view on line 1—1 of Fig. 3 through a portion of the can blank magazine, showing the spring top employed to prevent the drawing of a blank back into the magazine after the removal therefrom; Fig. 7 is a detail side elevation of the electrical connections of the magnets for the mechanism employed for lifting the blanks from the feed table after their removal from the magazine; Fig. 8 is a further detail of the electrical connecting means and the spring stop employed for insuring the proper alinement of the lifting magnets; Fig. 9 is a detail view of a portion of the track showing the cans 148 and 149 thereon and adjacent parts; Fig. 10 is a detail longitudinal section of the solder containing and heating devices, the section being taken on the line C—C of Fig. 11; Fig. 11 is a plan view of the same; Fig. 12 is a transverse section through the solder reservoir and pump, the section being on the plane indicated by the line D—D of Fig. 11; Fig. 13 is a longitudinal section through the solder reservoir showing also the driving mechanism of the solder pump, the section being on the line E—E of Fig. 11; Fig. 14 is a detail of a portion of the solder pump driving mechanism; Fig. 15 is a transverse section of the solder containing and heating devices, the section being on the line F—F of Fig. 11; Fig. 16 is an end elevation of the solder pot; Fig. 17 is a detail plan view of an adjustable flexible wiper for removing the excess of solder from the seamed bodies; Fig. 18 is a detail side elevation of the solder feeding mechanism; Fig. 19 is a detail end view of the same; Fig. 20 is a detail transverse section through the solder feed rolls; Fig. 21 is a detail sectional plan of a portion of the supporting bracket for the solder feed rolls; Fig. 22 is a detail section of the friction connecting means for the main driving pulley of the machine; Fig. 23 is a detail end elevation of the ejector for removing the formed bodies from the carriages and carrying the same to the justifying chute, and the driving means therefor, showing also the carriage track in section on line G—G of Fig. 1; Fig. 24 is a detail of the adjustable gripper for holding the can bodies to the ejector; Fig. 25 is a detail side elevation of a portion of the carriage track showing the cam for releasing the holding pad of the carriage; Fig. 26 is a detail side elevation of the driving means for the feed table; Fig. 27 is a side elevation of the justifying delivery chute and its connecting means with the auxiliary heading machine; Fig. 28 is an end elevation of the lower end of the justifying chute; Fig. 29 is a side elevation of the upper end of the delivery chute showing an alternative means for retaining the can bodies therein; Fig. 30 is a sectional end view of the same, the section being on the line H—H of Fig. 29; Fig. 31 is an end elevation of the forming carriage for round can bodies; Fig. 32 is a side elevation of the same; Fig. 33 is an end elevation of the same with the folding wings closed; Fig. 34 is a longitudinal central section thereof; Fig. 35 is an end elevation of the forming carriage for square can bodies; Fig. 36 is a side elevation of the same, showing the wings open; Fig. 37 is an end elevation of the same with the folding wings closed; Fig. 38 is a longitudinal central section thereof; Fig. 39 is a front elevation of the tracks for controlling the movement of the folding wings of the forming carriages; Figs. 40, 41 and 42 are diagrammatic views showing the positions assumed by the folding wings of the carriers when the same are in the positions indicated by lines K—K, L—L, and M—M, respectively, of Fig. 39; Fig. 43 is an end elevation of a portion of the carriage tracks showing the means employed for introducing the carriages into said tracks; Fig. 44 is a sectional plan view of the same.

In the drawing 1 is the main frame of the machine, the same preferably comprising two side frames connected by suitable brackets or webs 2 and cross rods 3.

Between the upright side frames 1 1 and secured thereto by suitable supporting brackets 4, 5, 6 are the endless carrier tracks 7 7 in or upon which the series of can body forming and holding carriages 131 travel. The endless tracks 7 are upright and substantially circular in form about the axis of the rotary driving device or wheel 15 as a center, and are furnished at their lower part with a horizontal section 12, united to the circular portion of the track by upright straight sections 8 and curved sections 11. The several track sections 7, 8, 9, 10, 11 are joined by suitable overlapping portions 12, as indicated in the drawings. 13 is the shaft of the rotary driving device or wheel 15, the same being journaled in suitable bearings 14 on the frame. The rotary driving device or wheel 15 consists, preferably, simply of a central hub having integral spokes or radial arms. Pivotal swinging links 16 connect the can body forming and holding carriages with the rotary driving device or wheel, one link 16 connecting each carriage 131 with one of the radial arms or spokes of the rotary driving device. The various positions assumed by the swinging links in compensating for the varying radial distances of the carriage track 7 from the shaft or axis of the rotary driving device 15, is clearly indicated in Fig. 1.

On the shaft 13 is a gear 17 positioned as shown in Fig. 2 and which meshes with a pinion 18 on a shaft 19 journaled in the bearings 20 and 21. On said shaft 19 is the main driving pulley 22 which is connected to any suitable source of power. The relative sizes of the gear 17 and the pinion 18 is inversely proportioned as one to the number of the forming carriages, so that for each revolution of the shaft 19 the forming carriages are advanced a distance equal to the interval between any adjacent pair of the same.

At the front and near the upper end of the side frames 1 the brackets 22 are secured. In said brackets the shafts 23 are adjustably secured by set screws as indicated at Fig. 1 and on said shafts are secured the side pieces 24 of the feed table top 25. Secured on the upper side of the feed table top are the vertical guide ways 26 of the general form indicated in Figs. 3, 4 and 5, the same forming a magazine adapted to contain a pile of can body blanks X, as indicated in Figs. 3, 4, 5 and 6. Positioned below the central part of the pile X of blanks is a longitudinally reciprocating plate 27 fitting into and movable within a suitable groove in the table top 25. The forward portion of the plate 27 is offset an amount equal to the thickness of one of the can body blanks and at said offset is placed a removable strip 28 secured to plate 27 by screws 29. The said strip is preferably of hard metal capable of resisting wear and, when worn, may be readily replaced. The front lower end of the guide ways 26 is open an amount equal to the thickness of one of the blanks, as indicated in Figs. 5 and 6, so that when the plate 27 is pushed forward the strip 28 engages the rear edge of the lower edge of the lower blank and pushes the same out of the magazine onto the table top in front thereof. On pulling the plate 27 back any tendency of the blank to return to the magazine is made impossible by the spring actuated stops 30 shown in Fig. 6, and in dotted lines in Figs. 3 and 5. Said stops also serve to hold down the blank near the ends until it has been pushed entirely out of the magazine, thereby assuring the proper engagement of the sheet by the reciprocative feeding plate. The rear edges of the spring stops 30 are beveled, as shown, so that the blanks may be readily pushed out of the magazine. The plate 27 is given an intermittent reciprocating motion as follows: Below the table top is a plate 31 connected to a plate 27 through slots 32 in the table top by screws 33, the proper distance between the side plates being maintained by spreader blocks 34. On the plate 31 is a block 35 to which is pivotally connected a short connecting rod 36. The connecting rod 36 extends, and is pivotally joined to the head 37 on the rod 38, adjustably held in block 39 on the shaft 40, journaled in bearings 41 on the side pieces 24 of the table.

On the inner end of the shaft 19 is a crank 42 from which a connecting rod 43 extends to an arm 44 secured to a short shaft 45 journaled in a bearing 46 on one of the side frames 1. On the outer end of said shaft is an arm 47 at the lower end of which is a pin 48 extending through a slot 49 in a rod 50. The length of the slot 49 may be adjusted by a set screw 51. The end of the rod 50 is tubular in form and a rod 52 is adjustably held therein by a set screw 53. The rod 52 passes through a block 54, which block is normally held firmly against the head 55 on said rod by a spring 56 placed over said rod between the block and the tubular portion of said rod 50. The lower end of the block 54 has a notch 57. Extending forwardly from the said block is a round handle 58, while on the rear side thereof is a flat tail piece 59. The foregoing train of connecting mechanism is clearly shown in Fig. 26. On the shaft 40 is a crank arm 60 with which the notch 57 in the block 54 is adapted to engage. The crank 42 on shaft 19 moving continuously imparts a continuous reciprocating motion to the pin 48 on arm 47. The rod 50 is given an intermittent reciprocating motion thereby, pausing at each end of its stroke while the pin 48 traverses the length of the slot 49. The intermittent motion imparted to the shaft 40 intermittently reciprocates the feed plate 27 through the connecting mechanism herein before described. When desired to stop the action of the feeding mechanism, the handle 58 on the block 54 is raised and forced between the spring clips 61 on the bar 62 attached to the table top 25. The block 54 on being thus held out of engagement with the crank 60 no motion is imparted to the feeding mechanism. The purpose of the tail piece 59 is to prevent the spring 56 from dropping down into engagement with the crank 60 when the handle 58 is released from the spring clips to again throw the feed mechanism into operation. The spring 56 by being compressed should an abnormal tension be required to operate the feed table, prevents breakage of any of the parts of said mechanism should the same have become choked or clogged in any manner. A handle 63 secured to the shaft 40 permits the same to be moved and the feed mechanism operated by hand, should this be desired.

Pivoted on the side pieces 24 of the feed table and in the relative positions shown in Figs. 1, 3, 4 and 5, are the arms 64 carrying the electro-magnets 65 from which the elongated pole pieces 67, extend inwardly, as shown in Figs. 3 and 4. Integral with the arms 64 are downwardly extending arms 68 which are connected by rods 69 to the arms 70 on the ends of the shaft 40, as shown. Thus when the shaft 40 is rotated to operate plate 27 and remove a blank from the magazine the pole pieces 66 of the electro-magnets are moved downwardly through an arced path to the pole pieces and is lifted thereby to a vertical position and into the path of the forming carriages to be engaged and removed thereby, as will be described hereinafter. Integral with the arms 64 and 68 is an arc or segment 71 with which engages a round pointed spring-actuated stop 72 carried on the arm 73, adjustably held on the shaft 23. The said spring stop engaging depressions on the face of the segment at the points coincident with the limits of movement thereof holds the same against accidental displacement during the time in which it stands stationary at said limits of movement. On the side of the segment 71 is a segment of insulating material 74 on the face of which is secured an arc 75 of conducting material. A spring-actuated pin 76 carried by a block of insulating material 77 on the arm 73, engages the said conducting arc. One terminal of the electro-magnet 65 is connected by a wire 78 to the conducting arc 75, while the other terminal of the electro-magnet may be grounded to the frame of the machine, or a second conducting arc and contact pin may be provided similar in construction and arrangement to the arc 75 and pin 76. Suitable electrical connections are made to the pin 76 and frame of the machine, by which an electrical current may be directed through the electro-magnets to energize the same. The construction and arrangement of the spring stop 72 and the electrical connections are shown in Figs. 7 and 8. While the use of electro-magnets to lift the blanks from the feed table after the same have been removed from the magazine, and to carry said blanks into the path of the forming carriages, is the preferred construction, this function of the machine may be performed in various ways.

Secured to the lower cross pieces of the side frames 1 are the bars 79 supporting the solder pot. Threaded rods 80 having nuts 81 thereon pass through said bars and extend upwardly therefrom, the height thereof being adjustable by means of said nuts 81. The rods 80 are screwed into suitable bosses on the lower side of the cylindrical body 82 of the solder pot. At the upper part of the cylindrical body 82, and preferably integral therewith, is a longitudinally extending body of metal 83, within which is a slot 84, as indicated in Figs. 10, 11, 12 and 15. Surrounding said slotted body or slotted soldering iron is a trough 86 adapted to receive the overflow from the slot and conduct the same to the solder reservoir, as will appear hereafter. The bottom of the trough is inclined, as shown by the dotted line 384 on Fig. 10, toward the opening 87 leading to the bottom of the pump cylinder 88 at the side of the solder reservoir 89. The cylindrical opening 85 extends across below the bottom of the solder reservoir and below the slot 84 with which it is connected by a hole 90, as indicated in Figs. 10, 11 and 15. Holes 91 connect the reservoir with the opening 85, as shown. Working within the pump cylinder is a piston 92 from the bottom of which an opening 93 extends upwardly, thence to one side of the piston where it terminates in a groove or slot 94 in the side of the piston, as shown in Fig. 12. In the side of the cylinder adjacent to the groove 94 is a hole 95 which lies in front of said groove when the piston is near the bottom of its downward stroke. Molten solder overflowing from the slot 84 runs around the inclined bottom of the trough 86 and flows down into the bottom of cylinder 88 through the hole 87. As the piston moves on the downward stroke the opening 87 is cut off by the lower edge of the piston, and the solder in the bottom of the cylinder is forced up through the hole 93 in the piston and runs out of the same through the slot 94 and hole 95 into the reservoir. The actuating means for the pump piston is shown in Fig. 13. An eccentric or cam 97 is secured on the shaft 13 at the position indicated in Fig. 2. A revoluble disk 98 carried on the upwardly extending arm of the bell crank lever 99, pivoted at 100 on the side frame 1, is held in engagement with the cam 97 by the adjustable weight 96 on the rod 101 secured to the bell crank lever, as shown in Figs. 1 and 13. On the end of the horizontal arm of the bell crank lever 99 is a pin 102 which passes through a slot 103 in the pump piston rod 104. The upper end of the piston rod is bent over into a hook 105 to which is attached a spring 107, which is extended downward and attached to the end of the pin 102. Should the machine be run when the solder is not molten, thus preventing movement of the pump piston, the movement of the bell crank lever 99 merely stretches the spring 107, the pin 102 moving up and down in the slot 103 without resisting or lowering the piston rod. To facilitate removal of solder from the pot and reservoir, should it be desired, an opening 108 is provided extending from the lowest point of the passage 85, which opening is normally closed by a plug 109, as shown in Fig. 13. By removing said plug when the solder is molten, all the contents of the reservoir and solder pot may flow through the same.

Passing through one end of the cylindrical body 82 of the solder pot, is a perforated tube 110 at the outer end of which are suitable connections 111 and 112 for admitting air and gaseous fuel, respectively, in the proper proportions for producing complete and perfect combustion. Into the lower side of the cylindrical body 82 is screwed a pipe 113 which extends to a point underneath the solder reservoir, as shown in Fig. 15. A nipple 114 entering the pipe 110 extends into the pipe 113 and gas passing through the same is burned under the solder reservoir, keeping the same heated. One end of the cylindrical pot body 82 is closed by a movable plate 115 which may be turned aside, as shown in Fig. 16, to give access to the interior of the pot. The said plate is normally turned so as to close the end of the cylindrical body and an opening 116 is provided therein for the escape of the products of combustion formed within the cylinder. To prevent unnecessary radiation of heat from the solder pot, the cylindrical body thereof may be covered with asbestos or other non-conducting substance, as shown at 234, Figs. 2, 10, 12 and 13.

The level of the molten solder in the reservoir is maintained at a point a little above the top of the slot 84 so that a bead of the molten solder will project above the top of said slot, but will not normally rise to a point sufficient to overflow into the trough 86. Provision is made for automatically replacing the solder removed by adhering to the can bodies as follows: A ratchet wheel 117 is revolubly mounted on a small shaft 118 held by the bracket 119, secured to the side frame 1, as shown in Fig. 1. An arm 120 is pivotally hung on said shaft and connected by a rod 121 to the slotted lever 122 on the feed table shaft 40. On the arm 120 is a pawl 123 engaging the ratchet 117. Secured to the ratchet is a corrugated roller 124, and also a small gear 125 both of which are rotatable with the ratchet. A bent lever 126 is pivoted on the bracket 119, on one end of which is adjustably secured a weight 127, while on the other end is carried a corrugated roller 128 and a gear 129 similar in size and construction to the roller and gear 124 and 125. The said rollers and gears are normally held in engagement by the weight 127. A spool of wire or ribbon solder Q is supported on suitable brackets 130 from which spool the wire or ribbon is passed between the corrugated rollers 124 and 128, thence downward into the solder reservoir 89. The position of the connecting rod at its point of connection with the slotted lever 122 determines the length of stroke of the connecting rod 121, this in turn determines the number of ratchet teeth engaged at each stroke, the amount of turn of the ratchet and the length of the wire or ribbon of solder fed. The construction indicated permits the amount of solder fed to the reservoir to be accurately gaged according to the amount consumed. In this connection may also be noted the fact that as the shaft 40 is only moved when a blank is fed to the forming carriages, the mechanism will be actuated and the solder fed into the reservoir only when the can body blanks are being fed to the forming carriages and the solder consumed thereby.

The body forming and holding traveling carriages 131 which move along the track 7, are preferably provided with wheels 132 to diminish the friction, and each has a horn or mandrel 137 around which the can body blank is formed or folded, and a pair of opening and closing folding wings or jaws 141 which fold or shape the blank around the horn or mandrel 137. The carriage 131 has a standard 133 extending upward, and a space block 134 secured thereto by a screw 135 and pin 136. The mandrel or horn 137, corresponding in form to the inside of the can body desired to be made on the machine, is secured on the forward face of the space block 134. The lower front edge of the spacer block is extended outward to form a gage plate 138, as indicated. From the front part of the base plate 131 a standard 139 extends upwardly and between said standard and the rear standard 133 are the small shafts 140 on which are pivoted the folding wings 141. Springs 142 coiled around the shafts 140 engage the folding wings and normally hold the same outwardly away from the mandrel 137. The said wings when pressed inward against the tension of the coiled springs 142 are adapted to close the mandred except at a portion of the upper part where the seam or lap of the can body is made. Beneath the said lapping point in the mandrel, is placed a block of some refractory material 143, which is a poor conductor of heat, such as carbon, fireclay or the like. The object of this provision is to facilitate the flow of solder in the seam by preventing the radiation of heat into the metallic body of the mandrel. Below the mandrel and normally pressed against the same is a gripping clamp 144 carried by a lever 145 pivoted on and passing through a slot in the rear standard 133. At the rear end of said lever the same is engaged by a spring 146, the opposite end of which rests against the tail piece 147 on the rear standard. On the sides of the lever are rollers 150 adapted to engage the cams 148 and 149 secured to the carriage track adjacent to the points at which the can body blank is gripped and released. The said cams by raising the rollers pull the gripping pad 144 downward and out of contact with the mandrel and permit the ready introduction of the can blank and removal of the seamed body, as will be more fully set forth hereinafter. In the under side of the base plate 131 are recesses 151, into which fit the ends of the swinging links 16 connected with the arms 15, as before mentioned.

In the carriage track section 8 are small removable portions 152, as shown in Figs. 43 and 44, by removing which the wheels 132 of the carriages may be introduced into the trackway, after which the said pieces are replaced as shown. On the sides of the folding wings 141 are rollers 153, which are adapted to be engaged by suitable trackways to hold said wings closed upon the mandrels. Said wing track 154 extends parallel with the lower parts of the carriage track section 9, track sections 11, section 10, section 8, and approximately one half of the semicircular section 7, throughout which portions said wing track is supported and held in position by the braces 155 and 156, as indicated in Figs. 1 and 2. At a point near the top of the semicircular carriage track section the wing tracks spread outward away from the mandrel by the coiled springs 142 on the shafts 140. To insure the positive opening of the wings, opening wings 158 are provided, the points of which engage the beveled portions 159 on the inside of the wings. Said opening rails extend substantially parallel with the wing tracks 157 and are supported, together with the wing tracks, by the curved straps 160 secured to the carriage track section 7, as shown in Figs. 1 and 23.

At a point opposite the position of the can body blank lifting magnets 65, when in the raised or vertical position, the wing tracks 157 and the opening rails 158 are given an additional depression, as shown at 161 and 162, Figs. 1 and 39, which depression causes the folding wings to assume a position, shown diagrammatically in Fig. 40. Simultaneously with said opening the gripping pad 144 is opened by the cam 149, as before stated, and the blank held by the magnets enters between the mandrel and the gripping pad, as Y (Fig. 40), and strikes the gage plate 138 which properly justifies the blank, after which the rollers 150 become disengaged from the cam 149 and the gripping pad is again pressed toward the mandrel, thereby firmly holding the blank in position. As the carriage continues its downward motion the ends of the blank are engaged by the outwardly curved ends 175 of the opening rolls 158, whereby said ends are raised, as shown in dotted lines in Fig. 40, so that when the folding wings are closed the points of the same will properly engage the under side of the blank to fold the same around the mandrel.

In most of the cans in general use, the blanks are provided with a tearing strip, the end of which projects beyond the main body of the blank. To prevent this end of the tearing strip becoming soldered to the body, it is necessary to protect the same from the solder as the carriage passes over the solder, the most convenient manner of so protecting the strip being to fold the same under the wing on the opposite side of the mandrel. The manner in which this folding under of the strip is accomplished, is clearly illustrated in diagrammatic Figs. 41 and 42. The folding wing on the side of the mandrel, opposite the tearing strip is first closed by the wing track portion 163, the other wing being partly closed, as shown in Fig. 41. After thus closing the wing opposite the strip, said wing is again permitted to open outward slightly by a depression 164 in its wing track, the other wing being meanwhile completely closed, thus bringing the strip into position, as shown in Fig. 42, after which the first wing is again closed by its track, the strip fitting into a suitable recess 165. To hold in position the side of the blank opposite the strip while the wing on said side is opened to allow the folding under of the strip, a small spring 166 is provided on the inside of said wing, which spring presses the blank inward, as indicated in the drawings. Instead of using spring 166 to hold the blank in position during the folding of the strip, raised or inclined portions 175 on the track 158, as illustrated in Fig. 39, and in dotted lines in Fig. 40, may be employed, the same being adapted to engage the edge of the blank and hold the same against the mandrel while the strip is folded in.

After folding the blanks around the mandrel, as described, the carriages pass onto the horizontal track section 10, in passing over which the lap of the folded blank is bathed in the bead of solder projecting from the slot 84 of the solder pot. In passing over the end of the solder pot the seam is engaged by the wiping point 167 on the pot, and the major part of the adhering solder wiped off, the same flowing back into the inclined trough 86, and being returned to the solder reservoir, as previously described. A further portion of the adhering excess of solder is scraped off by the wiping strip 168 and falls into a suitable tray 169 supported by the side frame 1, as shown in Fig. 1. As a further means of removing any excess of solder from the outside of the seam, I provide a flexible wiping strip 170, adjustably held by the rod 171 secured to the small bracket 172 on the wing track 154, as shown in detail in Fig. 17. Any solder which may be scraped off by the wiper 170 falls on the inclined guideway 173 and is returned thereby to the tray 169.

After passing the solder pot and the various wiping devices, the soldered seams are cooled while the carriages pass up the track section 8 and around the first part of the curved track section 7. After the opening of the folding wings of the wing track portion 157 and the beginning of the opening rails 158, the gripping pad 144 is lowered by the rollers 150 engaging with the cam 148, and the seamed body is removed from the mandrel, as follows: The curved brackets 174 (shown in detail in Fig. 23), are secured to the carriage track section 7, as indicated. In the bearings 176, at the top of said standards, a shaft 177 is journaled. The proper alinement of the bearings is insured by the brace rod 178 passing through lugs 179 on the top of the bearings, as shown. On the end of the shaft 177 is a crank 180, through the end of which passes the stem of a block 181. On the shaft 19, at the position shown in Fig. 2, is an eccentric 182, from the strap of which, 183, a rod 184 extends upwardly and passes through the swiveled block 181 on the crank 180. On the upper end of rod 184 is a head 185, and between the block 181 and the adjustable collar 186 is a spring 187. The movement of the eccentric 182 imparts a reciprocating movement to the rod 184, which movement on its upward motion is yieldingly imparted to the shaft 177 through the spring 187, block 181 and crank 180, and on its downward movement positively imparted by the head 185. To insure smoothness of motion of shaft 177, the friction pulleys 188 are placed thereon over which are passed the bands 189, one end of which is adjustably held by the nuts 190, while the band is kept under a constant tension by the small coiled spring 191 beneath the head on the other end thereof, as shown in Fig. 1. Between the bearings 176 the collars 192 are secured on the shaft 177, and on said collars are pivoted the arms 193 which are adapted to swing down into the path of the forming carriages. At the upper ends of said arms 193 the same are turned inwardly, and through the same are passed the small bolts 194, between the heads of which and the arms are springs 195, which normally press upwardly and tend to pull the lower ends of the arms toward each other. The amount of said inward pull is regulated by small adjusting screws 196. At the lower ends of the arms 193 are bosses 197, in which the stems 198 are adjustably held by set screws 199. On said stems are small lugs between which are pivoted the latches 200, having the tongues 201 extending over the ends of the stems, which tongues are normally held against engagement with the stems by the springs 202 held in suitable recesses in the stems, as shown in Fig. 24. As the arms 193 are swung backward by the eccentric 182, acting through the mechanism described, the forming carriages move into position adjacent to the same, the rearwardly extending curved edges of the latches 200 engage the front edge of the seamed can body, and the arms 193 are pressed outward allowing the latches to pass to the rear of the can body. The arms then starting their forward movement and moving at a greater speed than the carriage, the fingers 201 engage the edges of the can body gripping the same between them and the edge of the stem, pull the can body off the mandrel and carry the same upward to the mouth of the delivery chute. The openings 202, at the sides of the mandrels, are to permit the passage of the latches 200 in removing the can body from the mandrels.

As the arms 193 reach the limit of their upward movement, the can body enters the mouth 203 of the delivery chute and is there held, so that on the return stroke of the arms 193 the body is left in the chute by the following means: Supported above the mouth piece 203 of the delivery chute is a small shaft 204, on which is secured an arm 205 carrying the plate 206, which is adapted to swing in under the mouth piece 203 to close the same. A spring 207 attached to the arm 205, normally pulls the same over the opening to the mouth piece 203, as shown in dotted lines in Fig. 27. Pivoted on the shaft 204 is an arm 208, connected by the rod 209 to the arm 210 secured to the shaft 177. On the shaft 204 is secured a disk 211 having a single ratchet tooth on the face thereof, with which a pawl 212 carried by the arm 208, is adapted to engage. As the shaft 177 is rotated to move the arm 193, carrying the can body up into the mouth piece 203, the plate 206 is drawn back, as shown in Fig. 27, through the action of the pawl 212 and connecting mechanism as described. As the arm 208 reaches the limit of its backward movement the pawl engages a pin 213 carried on the supports of shaft 204, said pin releasing the pawl from the disk 211 and permitting the spring 207 to quickly pull the plate 206 over the opening in the mouth piece 203, as indicated in dotted lines in Fig. 27. The plate 206 extending between the arms 195 behind the can body, retains the can body in the mouth piece so that it becomes detached from the grippers on the arms, and is retained in the mouth piece. As soon as the can body is released, the same slides down the justifying chute 214 and into the horizontal conveyer trough 215 extending to the auxiliary heading machine. In the bottom of said trough is a continuously running belt 216, onto which the bodies are pushed by the plate 217, reciprocatingly operated from the heading machine by a rod 218. Should it not be desired to run the bodies into the heading machine, a door 219 at the bottom of the justifying chute may be opened, as shown in Fig. 28, thus permitting the bodies to fall out of the chute into any suitable receptacle. It will be noted that by the peculiar form of the justifying chute, the can bodies are placed in the conveying trough 215 with the seamed edges upward, so that they may be readily inspected by the operator of the machine, said trough going directly past the feed table, as shown in Fig. 1. An alternative mechanism for retaining the can bodies in the mouth piece 203, is shown in Figs. 29 and 30, the same consisting of the latches 220 pivotally held at the upper side of the mouth piece, and normally pressed inward by the springs 221 as far as permitted by the bolts 222 passing through the sides of the mouth piece.

In Figs. 31 to 34, inclusive, is shown the construction of a forming carriage for use with round cans. The general construction of said carriage is similar to the carriage for square cans, shown in Figs. 35 to 38. A noticeable variation in structure is the provision of additional rollers 233 for engaging with the opening rails 158 instead of the beveled portions 159 shown on the square can carriage. With round cans, as the seam is made on an arc, it is necessary to bend the ends of the blank in order to cause the same to lie smoothly and make a flat, smooth seam. This bending is accomplished by the following means: Revolubly mounted on the bracket 224 secured to the feed table top, are the rollers 225 and 226, as shown in Figs. 1, 3 and 5. The engaging point between said rollers lies directly below the face of the pole pieces 66 of the lifting magnets, so that when the can body blanks are pulled off said pole pieces by the forming carriages, the edges of said blanks are drawn between the rollers, which are formed so as to bend the blank into an arc of a circle, of a size equal to the can body to be formed.

In Figs. 35, 36 and 37, is shown a means of compensating for possible inequalities of the carriage wing track, said means comprising the following: One of the wing track rollers 153 instead of being journaled directly to the wing, is placed on an arm 227 pivoted on the wing and normally pressed outward against a stop pin 228 by a coiled spring 229. Thus the inward pressure of the wing track on the roller is received and transmitted to the wing by the spring, and any slight inequalities of the wing track compensated thereby. The compensation may be accomplished by pivoting the supports of one of the wing tracks and pressing the same inwardly by springs, the effect being the same in securing the final desideratum, viz: a spring-impressed folding wing.

In Fig. 22 is shown the preferred means of securing the driving pulley 22 to shaft 19. A collar 230 is rigidly secured to said shaft 19, as shown. The flat hub of the pulley is clamped against this collar by the nut 231 threaded on the shaft, a semielastic washer 232, of leather or the like, being placed between the hub end and the nut. The nut, which is slotted as shown, is locked in position when the proper tension is secured, by a small set screw 233, which clamps together the two split members of the nut and thus causes the split members of the nut to clamp or pinch the threaded bolt. The tension on said clamping means is adjusted so that the pulley will actuate the machine under normal conditions, but should an abnormal pull be required, the pulley will slip without moving the machine.

It will be obvious to those skilled in the art that numerous variations in the structure and mechanical details of the machine shown, may be made without departing from the spirit of my invention. Some of these variations or alternative mechanisms for performing the various functions have been shown in the drawings, as, for example, the means for engaging the can bodies at the mouth of the delivery chute and removing said bodies from the ejector. The forms of carriages for square and round can bodies have been shown, and it will be obvious that the machine could be readily adapted to make cans of any desired shape by changing the form of the mandrels and folding wings on the carriages. The rollers 225 and 226 are shown as embodying means for bending the ends of the blanks to make the same lie smoothly in cylindrical can bodies. In the making of lock seamed cans these rollers would be so shaped and additional rollers provided to form the proper hook. It will be understood that while this machine is designed primarily as a lap seaming machine, that those of its functions which are identical with those required in locked seams, may be performed with change of mechanism.

In the solder mechanism, advantage is taken of the capillary properties of molten solder, when confined in a vessel for which it has no attraction, to rise considerably above its retaining walls without overflowing. This characteristic allows me to pass the forming carriage, with its inclosed can body, over the solder containing slot, dipping the seam in the projecting bead of solder, without the can body or the body of the carriage coming into actual contact with the duct or the solder containing devices. This at the same time prevents any wear whatever on either the solder containing devices or the carriages, and saves the labor and trouble incident to such wear, in machines whose soldering devices come into actual contact with the tin and carriages, of keeping in proper shape and condition the soldering irons and similar constructions. The seam being soldered while the carriage is in an inverted position the tendency is for any surplus of solder to at once drain off, and the wiping lip provided at the end of the slot removes the major part of the solder adhering to the outside of the seam, returning said solder automatically by means of the inclined trough surrounding the slot and the solder pump, to the solder reservoir. The additional flexible solder wiping device provided removes the last adhering particles of solder, thus making a seam in which all the solder used is contained between the lap of the joint, thus using a minimum amount of solder. The cylindrical form of the solder pot prevents warping under the high temperature required to preserve the solder in a molten state, and the inclosed burners and non-conducting covering insures economy in the use of fuel besides avoiding uselessly heating the room in which the machines are placed. The method of automatically returning any possible overflow from the solder duct should be noted, particularly the construction of the solder pump, avoiding the use of valves, and actuating the pump through the medium of springs, whereby the pump may remain stationary in case the solder is cold or "frozen." A further novelty is shown in connecting the solder feeding mechanism with the can body blank feeding mechanism, whereby the same are operated simultaneously and additional solder supplied to the reservoir only as it is used on the seams of the cans.

A further feature of this machine is the accomplishment of delivering the can body at such a height on the machine as to enable it to be directed to an associate machine, for example a can heading machine, for performing a succeeding operation without the intervention of manual labor or of troublesome belted conveyers, and the justifying chute employed to accomplish this purpose I wish to claim broadly as a connecting link for automatically conveying the seamed body within view of the operator for inspection and to the header or other auxiliary machine.

By referring to Fig. 9, the relative position of the parts 148—149 is shown. These are short stationary tracks, riveted to the continuous carriage track, so disposed as to engage rollers 150 which releases the clamping contact or clamp 144 on the can body on the horn. The can is so positioned to release said clamp at the place where the ejector arm 193 engages the finished can body to remove the same from the horn, which is at the uppermost part of the machine. Stationary cam 149 is so positioned as to operate in the same manner on said clamp 144 at a point farther down said continuous carriage track where the carrier engages the blank which has been delivered within the path of the carrier by the can body blank feeding means. The rails 158 perform the function first of opening the wings at the uppermost part of the machine by entering between the wings and wedging the same open, and holding the same open until the lower end of said rail 175 is reached. These rails are then out of the way, allowing the lower cam track 154 to close the wings. The ends of the rails 158 are shown outwardly curved on Fig. 9, which is a side view of the same. The outward curved part ends at part 175, and is so curved as to partly assist the sheet or can body blank to fold around the horn of the carrier. Unless this assistance is given at this period, the folding wings on the carriage may reach farther than the length of the sheet on some cans, thereby doubling up and not folding properly. Fig. 9 also shows how the can is removed from the horn or mandrel, how the grippers seize it, how it is placed in the chute, and how the chute acts in justifying the can body. By justifying is meant the conveying chute so disposed as to carry the finished can body right side up properly positioned to drop correctly into the header chute.

This is a refiling of my original application Number 185,570 filed December 17, 1903.

I claim:

1. In a can body making machine, the combination with a series of continuously traveling can body forming carriages, having each a former horn and means for folding the blank around the horn, of an endless trackway for said carriages, having a straight horizontal portion and upright straight portions and curved connecting portions, and a rotary device journaled centrally of said track for moving said carriages around said endless track, substantially as specified.

2. In a can body making machine, the combination with a series of can body forming carriages, having each a horn and folding wings or jaws, of a stationary endless trackway for said carriages having a straight horizontal portion and curved portions, and a revolving wheel mounted centrally of said endless stationary track, and devices pivoted to said wheel and connecting said wheel with said carriages for propelling the same continuously along said track, substantially as specified.

3. In a can body making machine, the combination with a series of can body former carriages, having former horns and folding wings, of an endless trackway for said carriages having a straight horizontal portion, upright straight portions and curved connecting portions, and a revolving wheel mounted centrally of said endless trackway and provided with spokes and swinging links pivoted to said wheel and connecting said spokes with said carriages, substantially as specified.

4. In a can body making machine, the combination with a series of continuously traveling can body former carriages having body former horns and folding wings, of an upright endless trackway therefor, a spoked wheel having its axis central of said trackway, and a series of devices connecting said spoked wheel with the body former carriages each of said connecting devices extending directly from the wheel to a body former carriage whereby the latter may be moved along the trackway, substantially as specified.

5. In a can body making machine, the combination with a series of continuously traveling can body former carriages having body former horns and folding wings, of an upright endless trackway therefor, a spoked wheel having its axis central of said trackway, a series of links each pivotally attached to said wheel at a series of points around the axis thereof for connecting said spoked wheel with the body former carriages whereby the latter may be moved along the trackway, and stationary cam tracks for closing the folding wings around the horn, substantially as specified.

6. The combination with a series of can body former carriages having each a horn and a pair of folding wings or jaws, an endless upright track for said carriages, a propelling wheel for the carriages, links connecting the carriages with the wheel, a can body blank magazine or holder, a reciprocating slide for removing the blanks one at a time from the magazine or holder, and a movable device for carrying the blank removed from the magazine or holder into the path of the body former carriages, substantially as specified.

7. The combination with a series of continuously movable body former carriages, each having a body former horn and folding wings, an endless track for said carriages, means for propelling the carriages along said track, a can body blank holder, a reciprocating feeder for removing the lowermost blanks from the pile of blanks in the holder, a movable blank carrier for conveying the removed blanks into the path of the body former carriages, and means for operating said blank carrier coöperatively with the body former carriages, substantially as specified.

8. The combination with a series of movable body former carriages having each a body former horn and folding wings, of an endless track for said carriages, means for propelling the carriages along said track, a can body blank holder or magazine, a reciprocating can body feeder plate beneath said magazine furnished with means for engaging the lowermost blank of the pile of blanks in the holder, and a movable device for carrying the blank on said reciprocating plate from said plate to a position in the path of the can body former carriages, substantially as specified.

9. In a can body seaming machine, the former carriages, means for feeding can body blanks thereto, means for folding the blanks, an ejector for removing the seamed bodies from the carriages, and an inclined justifying chute into which the ejector delivers the bodies, said chute conducting the bodies within view of the machine operator and delivering the bodies properly justified to a header or other auxiliary machine.

10. In a can body seaming machine, continuously movable former carriages, an endless track for said carriages, feeding mechanism automatically delivering can body blanks to the carriages, solder containing devices past which the carriages are moved to apply solder to the seams, solder feeding mechanism for replacing solder removed from the containing devices, and means connecting the solder feeding mechanism with the can body blank feeding mechanism whereby said feeding mechanisms are actuated simultaneously.

11. In a can body seaming machine, forming carriages, mandrels thereon, wings for folding a can body blank about the mandrels and spaces in the mandrels adjacent to the laps or seams of the bodies for containing a substance non-conductive of heat, non-heat conductors in said spaces on said mandrels, an endless track for said carriages, an upright wheel having a series of links for moving said carriages around said track, and solder applying means, substantially as specified.

12. A can body machine comprising traveling forming carriages, means for automatically feeding can body blanks from a vertically disposed pile of blanks to the forming carriages, means for actuating the forming carriages to fold the blanks thereon, means for soldering the folded blanks, means for removing excess of solder from the seams, means for removing the seamed bodies from the carriages without interrupting the movement thereof, and a justifying delivery chute into which the seamed body is delivered by the means for removing the bodies from the carriages.

13. In a can body making machine, the combination with a series of can body forming carriages, having each a body forming horn and folding wings, of an endless trackway for said carriages having a horizontal portion, a slotted soldering iron, a solder reservoir communicating with the slot of the soldering iron, and a wheel furnished with links pivoted thereto for propelling the carriages along said track, said wheel being upright and turning on a horizontal axis within said track-way, substantially as specified.

14. In a can body making machine, the combination with a series of can body forming carriages, having each a body former horn and folding wings, of an endless trackway for said carriages having a horizontal portion, a rotating wheel having links pivoted thereto for driving the carriages along said track, a solder reservoir, a slotted soldering iron communicating with said reservoir, and a solder trough surrounding the slotted soldering iron, said wheel being upright and turning on a horizontal axis within said track-way, substantially as specified.

15. In a can body making machine, the combination with a series of can body forming carriages, having each a body former horn and folding wings, of an endless trackway for said carriages having a horizontal portion, a rotating wheel having links pivoted thereto for driving the carriages along said track, a solder reservoir, a slotted soldering iron communicating with said reservoir, a solder trough surrounding the slotted soldering iron, and a pump having a cylinder communicating with the solder reservoir and with said solder overflow trough, said wheel being upright and turning on a horizontal axis within said track-way, substantially as specified.

16. The combination with a solder reservoir, of a slotted soldering iron communicating with said reservoir, an overflow trough surrounding said slotted soldering iron, a pump communicating with the solder reservoir and overflow trough, and a series of traveling can body former carriages for conveying, holding and guiding the can bodies along said slotted soldering iron with their seams in contact with the raised bead of solder in the slot of said soldering iron, a track for the carriers and a wheel having links pivoted thereto and connected to said carriages for propelling the carriages along said track, said wheel being upright and turning on a horizontal axis within said track-way, substantially as specified.

17. The combination with a solder reservoir, of a slotted soldering iron communicating with said reservoir, an overflow trough surrounding said slotted soldering iron, a pump communicating with the solder reservoir and overflow trough, and a series of traveling carriers having can body former horns and folding wings, for moving the can bodies along said slotted soldering iron with their seams in contact with the bead of solder in the slot of said soldering iron, a track for the carriers and a wheel having links pivoted thereto and connected to said carriages for propelling the carriers along said track, said wheel being upright and turning on a horizontal axis within said trackway, substantially as specified.

18. The combination with a solder reservoir, of a slotted soldering iron communicating with said reservoir, an overflow trough surrounding said slotted soldering iron, a pump communicating with the solder reservoir and overflow trough, a plurality of can body carriers having each a body former horn and folding wings, an endless track for the can body carriers, and a wheel furnished with links pivoted thereto for propelling the can body carriers along said track, said wheel being upright and turning on a horizontal axis within said track, substantially as specified.

19. The combination with a solder reservoir, of a slotted soldering iron communicating with said reservoir, an overflow trough surrounding said slotted soldering iron, a pump communicating with the solder reservoir and overflow trough, a plurality of can body carriers, having each a body former horn and folding wings, an endless track for the can body carriers, having a horizontal portion, and a rotary wheel having links pivoted thereto for propelling the can body carriers along said track, said wheel being upright and turning on a horizontal axis within said track-way, substantially as specified.

20. The combination with a solder reservoir, of a slotted soldering iron communicating with said reservoir, an overflow trough surrounding said slotted soldering iron, a pump communicating with the solder reservoir and overflow trough, a plurality of can body carriers, an endless track for the can body carriers, having a horizontal portion, a rotary wheel for propelling the can body carriers along said track, and links connecting said wheel with the can body carriers, each of said links being pivoted at one end to said wheel, substantially as specified.

21. The combination with a plurality of carriages having can body former mandrels and folding wings, of an endless track for the carriages having a horizontal portion, a rotary driving wheel for the carriages, and links connecting the carriages with the wheel, each of said links being pivoted at one end to said wheel, substantially as specified.

22. The combination with a plurality of carriages having can body former mandrels and folder wings, of an endless track for the carriages, links connecting the carriages with the wheel, a solder reservoir, and a slotted soldering iron communicating with the solder reservoir, each of said links being pivoted at one end to said wheel, substantially as specified.

23. The combination with a slotted soldering iron, of a solder reservoir communicating therewith, and means including carriers having wings embracing the can bodies for carrying, supporting and guiding the can bodies over the soldering iron with their side seams in contact with the bead of solder in the slot of the iron without rubbing the can body against the iron and thus causing the iron to smear the outer surface of the can body with solder, substantially as specified.

24. The combination with a slotted soldering iron, of a solder reservoir communicating therewith, a solder overflow trough around the soldering iron, means for delivering the overflow solder back into the reservoir, and means including carriers having wings embracing the can bodies for conveying, supporting and guiding the can bodies over the soldering iron with their side seams in contact with the bead of solder in the slot of the iron without rubbing the can body against the iron and thus causing the iron to smear the outer surface of the can body with solder, substantially as specified.

25. The combination with a slotted soldering iron, of a solder reservoir communicating therewith, and a hollow shell surrounding the lower part of the soldering iron, a heater pipe in the shell, and means including carriers having wings embracing the can bodies for conveying, supporting and guiding the can bodies over the soldering iron with their side seams in contact with the raised bead of solder in the slot of the soldering iron without rubbing the can body against the iron and thus causing the iron to smear the outer surface of the can body with solder, substantially as specified.

26. The combination with a plurality of carriages having can body forming mandrels and wings, of an endless circular track for the carriages having a horizontal portion, a rotary driving wheel for the carriages, links pivoted to said wheel for connecting the carriages with the wheel one of said connecting links extending between the wheel and each carriage, and a slotted soldering iron beneath the path of the carriages, substantially as specified.

27. The combination with a plurality of carriages having can body forming mandrels and wings, of an endless track for the carriages having a horizontal portion, a rotary driving wheel for the carriages, links pivoted to said wheel and connecting the carriages with the wheel, a slotted soldering iron beneath the path of the carriages, and a solder reservoir communicating with the slotted soldering iron, substantially as specified.

28. The combination with a plurality of carriages having can body forming mandrels and wings, of an endless track for the carriages having a horizontal portion, a rotary driving wheel for the carriages, links pivoted to said wheel and connecting the carriages with the wheel, a slotted soldering iron beneath the path of the carriages, a solder reservoir communicating with the slotted soldering iron, and a solder overflow trough surrounding the soldering iron, and means for delivering the overflow back into the solder reservoir, substantially as specified.

29. The combination with a plurality of carriages having can body forming mandrels and wings, of an endless track for the carriages having a horizontal portion, a rotary driving wheel for the carriages, links pivoted to said wheel and connecting the carriages with the wheel, a slotted soldering iron beneath the path of the carriages, a solder reservoir communicating with the slotted soldering iron, a slotted overflow trough surounding the soldering iron, means for delivering the overflow back into the solder reservoir, a hollow shell surrounding the lower part of the soldering iron, and a burner or heater inside the shell, substantially as specified.

30. The combination with a plurality of carriages having can body forming mandrels and wings, of an endless track for the carriages having a horizontal portion, a rotary driving wheel for the carriages, links pivoted to said wheel and connecting the carriages with the wheel, a slotted soldering iron beneath the path of the carriages, a solder reservoir communicating with the slotted soldering iron, and a can track for closing the wings around the mandrels, substantially as specified.

31. The combination with a plurality of carriages having can body forming mandrels and wings, of an endless track for the carriages having a horizontal portion, a rotary driving wheel for the carriages, links pivoted to said wheel and connecting the carriages with the wheel, a slotted soldering iron beneath the path of the carriages, a solder reservoir communicating with the slotted soldering iron, and means for automatically delivering the can body blanks to the carriages, substantially as specified.

32. The combination with a plurality of carriages having can body forming mandrels and wings, of an endless track for the carriages having a horizontal portion, a rotary driving wheel for the carriages, links, pivoted to said wheel and connecting the carriages with the wheel, a slotted soldering iron beneath the path of the carriages, a solder reservoir communicating with the slotted soldering iron, means for automatically delivering the can body blanks to the carriages, and means for automatically ejecting the can bodies from the carriages, substantially as specified.

33. In a can body making machine, the combination with a series of traveling can body forming carriages, of an endless circular trackway for said carriages having a horizontal portion, and an upright wheel having its axis centrally of said endless track and above the horizontal portion thereof for driving the carriages along said track, said track being substantially concentric with said wheel one of said connecting links extending between the wheel and each carriage, substantially as specified.

34. In a can body making machine, the combination with a series of traveling can body forming carriages, of an endless circular trackway for said carriages, and an upright wheel having its axis centrally of said endless track and above the horizontal portion thereof for driving the carriages along said track, and links pivoted to said wheel and connecting said carriages with said driving wheel said track being substantially concentric with said wheel one of said connecting links extending between the wheel and each carriage, substantially as specified.

35. In a can body making machine, the combination with a series of traveling can body forming carriages, of an endless circular trackway for said carriages having a horizontal portion, an upright wheel having its axis centrally of said endless track and above the horizontal portion thereof for driving the carriages along said track, and a soldering device at the horizontal portion of said track said track being substantially concentric with said wheel one of said connecting links extending between the wheel and each carriage, substantially as specified.

36. In a can body making machine, the combination of a series of traveling can body forming carriages, with an endless circular trackway for said carriages having a horizontal portion, a rotating driving wheel, having its axis centrally of said endless track and above the horizontal portion thereof for the carriages, and links connecting the carriages with the driving wheel said track being substantially concentric with said wheel one of said connecting links extending between the wheel and each carriage, substantially as specified.

LEE C. SHARP.

Witnesses:
H. M. MUNDAY,
EDMUND ADCOCK.